(12) United States Patent
Mellor

(10) Patent No.: US 8,439,177 B2
(45) Date of Patent: May 14, 2013

(54) WRAP SPRING CLUTCH COUPLING WITH QUICK RELEASE FEATURE

(75) Inventor: Patricia M. Mellor, Winsted, CT (US)

(73) Assignee: Inertia Dynamics LLC, New Hartford, CT (US)

( * ) Notice: Subject to any disclaimer, the term of this patent is extended or adjusted under 35 U.S.C. 154(b) by 363 days.

(21) Appl. No.: 12/868,007

(22) Filed: Aug. 25, 2010

(65) Prior Publication Data

US 2012/0048673 A1    Mar. 1, 2012

(51) Int. Cl.
*F16D 41/20* (2006.01)
*F16D 13/08* (2006.01)

(52) U.S. Cl.
USPC ............. 192/41 S; 192/81 C; 192/107 T

(58) Field of Classification Search ........... 192/81 C, 192/33 C, 41 S, 107 T, 84.81; 188/77 W
See application file for complete search history.

(56) References Cited

U.S. PATENT DOCUMENTS

| | | | |
|---|---|---|---|
| 2,566,539 A | | 9/1951 | Starkey |
| 3,685,622 A | | 8/1972 | Baer et al. |
| 4,201,281 A | * | 5/1980 | MacDonald ............ 192/35 |
| 4,330,054 A | * | 5/1982 | MacDonald ............ 192/35 |
| 4,388,988 A | * | 6/1983 | MacDonald .......... 192/12 BA |
| 6,047,805 A | | 4/2000 | Nyquist et al. |
| 6,488,133 B1 | * | 12/2002 | Maurice et al. ........... 192/16 |
| 6,637,571 B2 | * | 10/2003 | Arnold et al. ........... 192/41 S |
| 2005/0236245 A1 | | 10/2005 | Maurice et al. |

FOREIGN PATENT DOCUMENTS

| | | |
|---|---|---|
| GB | 1021985 | 3/1966 |
| SE | 44261 | 8/1917 |

OTHER PUBLICATIONS

International Search Report issued in corresponding international (PCT) application PCT/US11/048540 (Oct. 7, 2011).
Written Opinion issued in corresponding international (PCT) application PCT/US11/048540 (Oct. 7, 2011).
"Wrap Spring Clutches", Inertia Dynamics LLC, 37 pgs, (published in 2004).

* cited by examiner

*Primary Examiner* — Richard M. Lorence
*Assistant Examiner* — Lillian Nguyen
(74) *Attorney, Agent, or Firm* — Dykema Gossett PLLC

(57) ABSTRACT

A rotational coupling is provided. The coupling includes first and second hubs disposed about an axis of rotation. The coupling further includes a wrap spring engaging the first hub and disposed radially outwardly of the second hub. The wrap spring is configured to couple the first and second hubs together for rotation during rotation of the first hub in a first rotational direction. The coupling may include one or more shoes disposed radially between the second hub and the wrap spring and springs for biasing the shoes radially outwardly from the second hub. By urging the wrap spring away from the second hub, quick and complete release of the wrap spring occurs even where the difference in rotational speed between the hubs during clutch disengagement is low.

22 Claims, 2 Drawing Sheets

WRAP SPRING CLUTCH COUPLING WITH QUICK RELEASE FEATURE

BACKGROUND OF THE INVENTION

1. Field of the Invention

This invention relates to rotational couplings and, in particular, to a wrap spring clutch having features to assist disengagement of the wrap spring upon release of the clutch.

2. Discussion of Related Art

A conventional wrap spring clutch includes an input hub and an output hub. A wrap spring is coupled to one of the input and output hubs and rotation of the hub to which the wrap spring is connected in a first rotational direction causes the spring to wrap down upon the other hub thereby coupling the two hubs together for rotation and engaging the clutch. The spring is unwrapped, and the clutch released, when the hub to which the wrap spring is coupled stops or reverses direction or as the result of an external force that prevents rotation of the wrap spring.

The operation of a wrap spring clutch depends on differences in rotational speed among the input and output hubs. In particular, the wrap spring will engage and disengage more quickly when there are large difference in rotational speed among the hubs. In many applications, however, the differences in rotational speed during engagement and disengagement of the clutch are relatively low. As a result, the wrap spring may cause an undesirable drag on the hub on which it has been wrapped during clutch disengagement. The wrap spring is also susceptible to increased wear as a result. Wrap spring clutches are therefore often unsuitable for applications in which the differences in rotational speed among the hubs are relatively low. Conventional wrap spring clutches attempt to overcome these issues by adjusting the interference fit of the wrap spring to the hubs. Adjusting the interference fit, however, requires a delicate balance to permit both clutch engagement (which can be compromised if there is insufficient interference) and disengagement (which can be compromised if there is too much interference). In many applications, a proper balance cannot be obtained and conventional wrap spring clutches cannot be used.

The inventors herein have recognized a need for a rotational coupling that will minimize and/or eliminate one or more of the above-identified deficiencies.

SUMMARY OF THE INVENTION

The present invention provides a rotational coupling.

A rotational coupling in accordance with one embodiment of the present invention includes first and second hubs disposed about an axis of rotation. The coupling further includes a wrap spring engaging the first hub and disposed radially outwardly of the second hub. The wrap spring is configured to couple the first and second hubs together for rotation during rotation of the first hub in a first rotational direction. The coupling further includes means, disposed radially between the second hub and the wrap spring, for urging the wrap spring away from the second hub. The urging means may include one or more shoes disposed radially between the second hub and the wrap spring and means, such as one or more springs, for biasing the shoes radially outwardly from the second hub.

A rotational coupling in accordance with the present invention represents an improvement relative to conventional rotational couplings and, in particular, conventional wrap spring clutches. By providing a mechanism that urges the wrap spring away from the hub on which the spring wraps down, the inventive clutch facilitates quick release of the wrap spring even in applications in which the difference in rotational speed among the hubs is low. As a result, the inventive clutch can be used in additional applications previously considered unsuitable for a wrap spring clutch.

These and other advantages of this invention will become apparent to one skilled in the art from the following detailed description and the accompanying drawings illustrating features of this invention by way of example.

DETAILED DESCRIPTION OF EMBODIMENTS OF THE INVENTION

Figure 1:
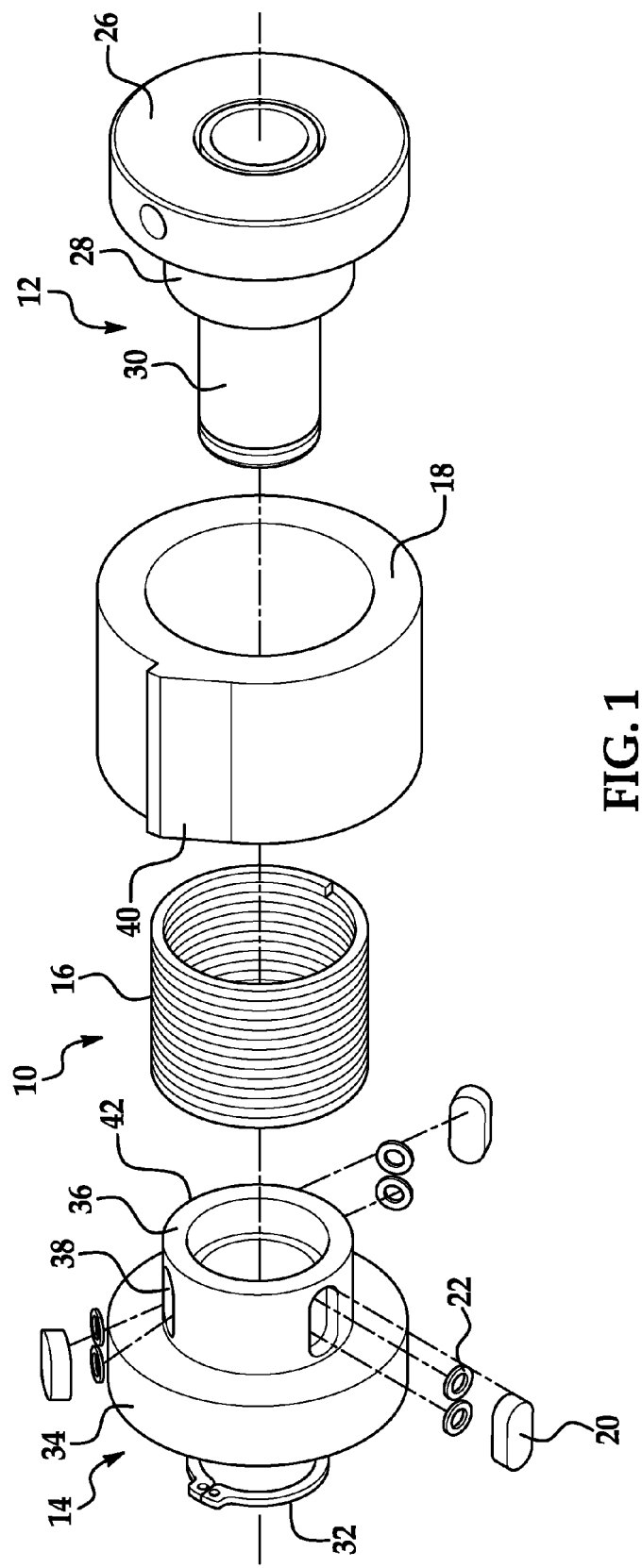
FIG. 1 is an exploded perspective view of a rotational coupling in accordance with one embodiment of the present invention.
Figure 2:
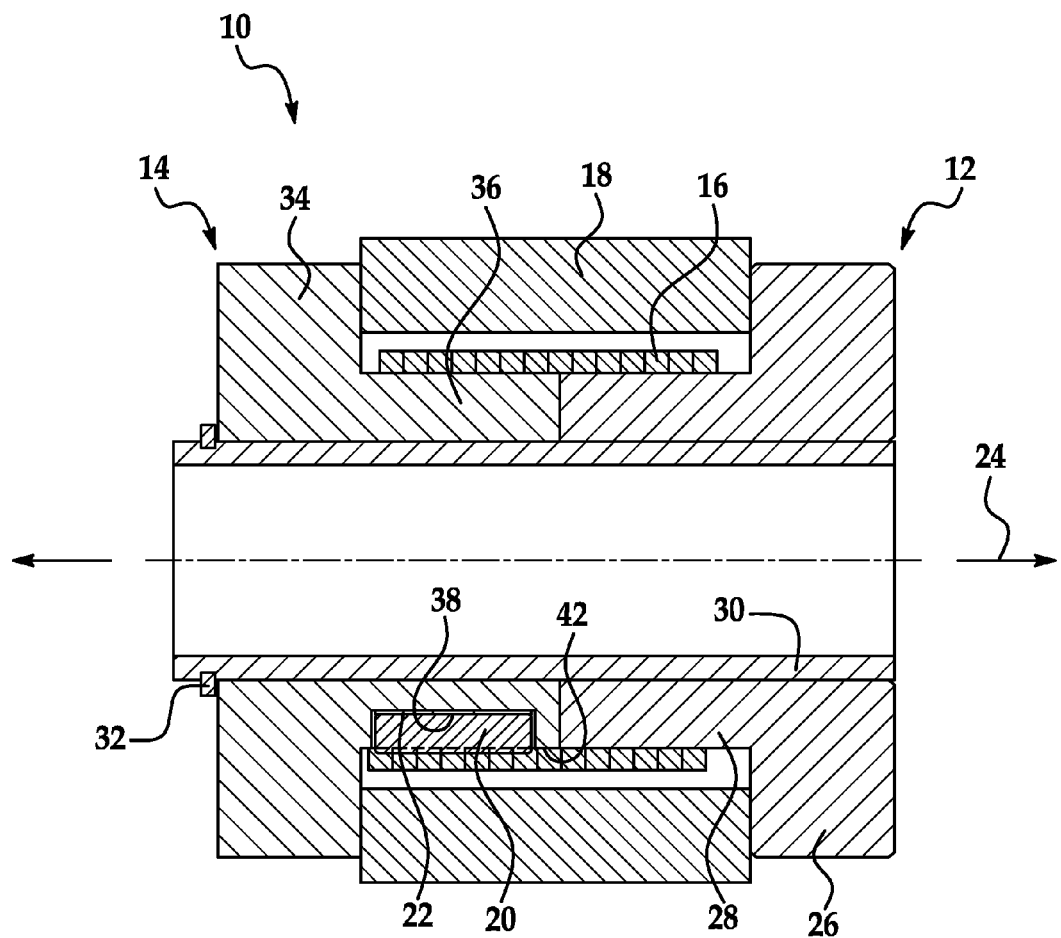
FIG. 2 is a cross-sectional view of the assembled rotational coupling of FIG. 1.

Referring now to the drawings wherein like reference numerals are used to identify identical components in the various views, FIGS. 1-2 illustrate a rotational coupling 10 in accordance with one embodiment of the present invention. Coupling 10 functions as a clutch to selectively transfer torque between input and output members such as shafts, pulleys, gears, sprocket and sheaves (not shown). Coupling 10 may also function as a brake on the output member when torque is not being transferred to the output member. In the illustrated embodiment, coupling 10 functions as a start/coast (or start/stop) clutch. It should be understood, however, that the invention could be used in other clutches such as overrunning/one-way clutches and single revolution clutches as well as clutch/brake combinations including any of the SC and WSC mechanical series clutches and/or CP and SAC actuated clutch series and/or DCB, CB and Super actuated clutch-brakes sold by Altra Industrial Motion, Inc. under the trademarks "DYNACORP" and/or "WARNER ELECTRIC." Coupling 10 may include an input hub 12, an output hub 14, a wrap spring 16, a control collar 18 and means, such as shoes 20 and springs 22, for urging wrap spring 16 away from output hub 14.

Input hub 12 provides a means for transferring torque from an input device such as a shaft, pulley, gear, sprocket or sheave (not shown) to output hub 14 through wrap spring 16. Hub 12 is conventional in the art and may be made from conventional metals and metal alloys and may, for example comprise an oil impregnated sintered iron hub. Hub 12 is annular and is disposed about a rotational axis 24. In the illustrated embodiment, hub 12 includes a portion 26 disposed at one axial end, a portion 28 having a reduced diameter relative to portion 26 and a tubular portion 30. It should be understood, however, that the configuration of hub 12 may vary depending on the application. Portion 26 is configured to limit axial movement of wrap spring 16 and collar 18. Portion 28 is configured to support a portion of wrap spring 16. Portion 30 is configured to receive a shaft through which torque is imparted to hub 12. Portion 30 may be joined to the shaft using a conventional key/keyway relationship or in another conventional manner.

Output hub 14 provides a means for transferring torque from input hub 12 to an output member such as a shaft, pulley, gear, sprocket or sheave. Hub 14 is conventional in the art and may be made from conventional metals and metal alloys and may, for example comprise an oil impregnated sintered iron hub. Hub 14 is annular and is disposed about axis 24 and may be coaxially aligned with input hub 12. Hub 14 is sized to receive portion 30 of input hub 12 which extends therethrough. Output hub 14 may be retained axially on portion 30 of input hub 12 using a retainer ring 32 disposed within a groove on a radially outer surface of portion 30 of input hub 12. In the illustrated embodiment, hub 14 includes a portion 34 at one axial end and a reduced diameter portion 36 facing portion 28 of input 12. It should be understood, however, that the configuration of hub 14 may vary depending on the application.

Portion 34 of hub 14 is configured to limit axial movement of wrap spring 16 and collar 18 and to connect to an output member. Although the illustrated embodiment is configured for a shaft input member and a pulley, gear, sheave, sprocket or similar output member, it should be understood that this relationship could be reversed and that hubs 12, 14 could be configured for attachment to a variety of input and output members.

Portion 36 of hub 14 provides an engagement surface for wrap spring 16 upon engagement of the clutch. When the clutch is not engaged, input hub 12 and output hub 14 are capable of relative rotation. In accordance with one aspect of the present invention, the radially outer surface of portion 36 of hub 14 defines one or more recesses 38 configured to receive a corresponding shoe 20 and one or more springs 22. Recesses 38 may be arranged such that the circumferential or angular distance is equal between any two circumferentially adjacent recesses 38. In the illustrated embodiment, hub 14 includes three recesses 38 with the circumferential center of each recess 38 being located approximately 120 degrees from the circumferential center of an adjacent recess 38. It should be understood, however, that the number of recesses 38 and their orientation relative to one another could be varied.

Wrap spring 16 is provided to couple input and output hubs 12, 14 together for rotation. Wrap spring 16 is conventional in the art and may be made from conventional metal and metal alloys. Spring 16 has an inner diameter that is slightly smaller than the outer diameter of portion 30 of input hub 12 and portion 36 of output hub 14. Accordingly, spring 16 may engage hubs 12, 14 in an interference fit. It should be understood, however, that spring 16 could engage input hub 12 in a variety of manners including by connection of a tang at one end of spring 16 to input hub 12. Rotation of hub 12 in one rotational direction causes spring 16 to wrap down tightly onto hub 14 to couple hubs 12, 14 together for rotation thereby transferring torque from input hub 12 to output hub 14. When rotation of hub 12 ends or hub 12 is rotated in the opposite rotational direction, spring 16 unwraps to uncouple hubs 12, 14 and disengage the clutch. Although spring 16 engages output hub 14 directly in the illustrated embodiment, it should be understood that spring 16 could wrap down upon an intermediary member to indirectly engage output hub 14. Further, although spring 16 wraps down upon output hub 14 in the illustrated embodiment, it will be understood by those of skill in the art that spring 16 could alternatively be oriented such that spring 16 wraps down upon input hub 12 during clutch engagement and unwinds from input hub 12 during release of the clutch. Another tang at an opposite end of spring 16 may be coupled to collar 18 for a purpose described hereinbelow.

Collar 18 provides a means for controlled engagement and disengagement of the clutch apart from relative rotation of input hubs 12, 14. Collar 18 is conventional in the art and may be made from glass-reinforced nylon with steel or aluminum inserts. Collar 18 is annular in shape and is disposed about axis 24, coaxially aligned with hubs 12, 14. Collar 18 is sized to be received between portion 26 of input hub 12 and portion 34 of output hub 14 upon assembly of coupling 10 and may contact one axial end face of portions 26, 34. Collar 18 is disposed radially outwardly of wrap spring 16 and has an inner diameter sized to permit a predetermined spacing relative to spring 16. Collar 18 includes a recess (not shown) or similar structure configured to receive a tang on one end of spring 16. Collar 18 has an outer diameter that may be greater than the outer diameter of portions 26, 34 of hubs 12, 14, respectively. A radially outer surface of collar 18 defines means, such as one or more ramps 40, that may be engaged a mechanical and/or electrical actuator such as a solenoid. When the actuator engages the ramp 40, the collar 18 is prevented from rotating. This action causes spring 16 to unwrap and decouple input and output hubs 12, 14.

Shoes 20 and springs 22 provide a means for urging wrap spring 16 away from output hub 14. In the illustrated embodiment, shoes 20 are substantially oval in shape with a longitudinal axis extending parallel to axis 24. It should be understood, however, that the size and shape of shoes 20 may vary as long as they provide sufficient engagement with wrap spring 16. Shoes 20 may be made from a thermoplastic and, in particular, polyoxymethylene sold under the registered trademark "DELRIN" by E.I. DuPont De Nemours and Company Corp. or other low friction materials. Shoes 20 are configured to be received within recesses 38 in portion 36 of hub 14. Shoes 20 are spaced equidistant around the circumference of hub 14 such that the circumferential distance is equal between any two circumferentially adjacent shoes 20. The illustrated embodiment includes three shoes with the circumferential center of any one shoe 20 spaced 120 degrees from the circumferential center of any adjacent shoe 20. It should be understood, however, that the number and orientation of shoes 20 may vary. For example, two shoes 20 may be positioned diametrically opposite one another. Shoes 20 are configured such that the distance of a radially outer surface of each shoe from axis 24 is substantially equal to a distance of a radially outer surface 42 of portion 36 of hub 14 from axis 24 when spring 16 is wrapped down upon output hub 14 and input and output hubs 12, 14 are coupled together for rotation.

Springs 22 provide a means for biasing shoes 20 radially outwardly away from hub 14 and towards spring 16. Springs 22 are disposed radially between portion 36 of hub 14 and spring 16 within recesses 38. Springs 22 are conventional in the art and may comprise wire wound compression springs or spring washers (e.g. Belleville washers) or leaf springs. In the illustrated embodiment, each shoe 20 is urged outward by two springs 22. It should be understood, however, that the number of springs 22 used to urge shoes 20 outwardly may vary. The radially outward force applied by springs 22 to shoes 20 is less than the radially inward force applied by spring 16 during clutch engagement, but exceeds the force of spring 16 during disengagement of the clutch.

A rotational coupling in accordance with the present invention represents an improvement over conventional rotational couplings and, in particular, conventional wrap spring clutches. By providing a mechanism that urges the wrap spring 16 away from the hub 14 on which the spring 16 wraps down, the inventive clutch facilitates quick and complete release of the wrap spring 16 even in applications in which the difference in rotational speed among the hubs 12, 14 is low. As a result, the inventive clutch can be used in additional applications previously considered unsuitable for a wrap spring clutch.

While the invention has been shown and described with reference to one or more particular embodiments thereof, it will be understood by those of skill in the art that various changes and modifications can be made without departing from the spirit and scope of the invention.

I claim:

1. A rotational coupling, comprising:
   first and second hubs disposed about an axis of rotation;
   a wrap spring engaging said first hub and disposed radially outwardly of said second hub, said wrap spring configured to couple said first and second hubs together for rotation during rotation of said first hub in a first rotational direction;
   a first shoe disposed radially between said second hub and said wrap spring; and
   a first spring disposed radially between said second hub and said first shoe.

2. The rotational coupling of claim 1, further comprising a second spring disposed between said second hub and said first shoe.

3. The rotational coupling of claim 1 wherein said first spring comprises a compression spring.

4. The rotational coupling of claim 1 wherein said first spring comprises a spring washer.

5. The rotational coupling of claim 1, further comprising:
   a second shoe disposed radially between said second hub and said wrap spring; and,
   a second spring disposed radially between said second hub and said second shoe.

6. The rotational coupling of claim 5 wherein said first and second shoes are diametrically opposite one another.

7. The rotational coupling of claim 5, further comprising:
   a third shoe disposed radially between said second hub and said wrap spring; and,
   a third spring disposed radially between said second hub and said third shoe.

8. The rotational coupling of claim 7 wherein a circumferential distance is equal between any two circumferentially adjacent shoes of said first, second and third shoes.

9. The rotational coupling of claim 1, further comprising a collar disposed radially outwardly of said wrap spring wherein a first end of said wrap spring is coupled to said collar.

10. The rotational coupling of claim 1 wherein said second hub includes a recess in a radially outer surface configured to receive said first spring and said first shoe.

11. The rotational coupling of claim 1 wherein a distance of a radially outer surface of said first shoe from said axis is substantially equal to a distance of a radially outer surface of said second hub from said axis when said first and second hubs are coupled together for rotation.

12. A rotational coupling, comprising:
    first and second hubs disposed about an axis of rotation;
    a wrap spring engaging said first hub and disposed radially outwardly of said second hub, said wrap spring configured to couple said first and second hubs together for rotation during rotation of said first hub in a first rotational direction;
    means, disposed radially between said second hub and said wrap spring, for urging said wrap spring away from said second hub.

13. The rotational coupling of claim 12, wherein said urging means comprises:
    a first shoe disposed radially between said second hub and said wrap spring; and
    means for biasing said first shoe radially outwardly from said second hub.

14. The rotational coupling of claim 13 wherein said biasing means comprises a compression spring.

15. The rotational coupling of claim 13 wherein said biasing means comprises a spring washer.

16. The rotational coupling of claim 13 wherein said urging means further includes:
    a second shoe disposed radially between said second hub and said wrap spring; and,
    means for biasing said second shoe radially outwardly from said second hub.

17. The rotational coupling of claim 16 wherein said first and second shoes are diametrically opposite one another.

18. The rotational coupling of claim 16 wherein said urging means further includes:
    a third shoe disposed radially between said second hub and said wrap spring; and,
    means for biasing said third shoe radially outwardly from said second hub.

19. The rotational coupling of claim 18 wherein a circumferential distance is equal between any two circumferentially adjacent shoes of said first, second and third shoes.

20. The rotational coupling of claim 13 wherein a distance of a radially outer surface of said first shoe from said axis is substantially equal to a distance of a radially outer surface of said second hub from said axis when said first and second hubs are coupled together for rotation.

21. The rotational coupling of claim 12, further comprising a collar disposed radially outwardly of said wrap spring wherein a first end of said wrap spring is coupled to said collar.

22. The rotational coupling of claim 12 wherein said second hub includes a recess in a radially outer surface configured to receive said urging means.

* * * * *